F. A. D. RANKINS.
STEAM METER.
APPLICATION FILED APR. 27, 1911.
1,055,491.
Patented Mar. 11, 1913.
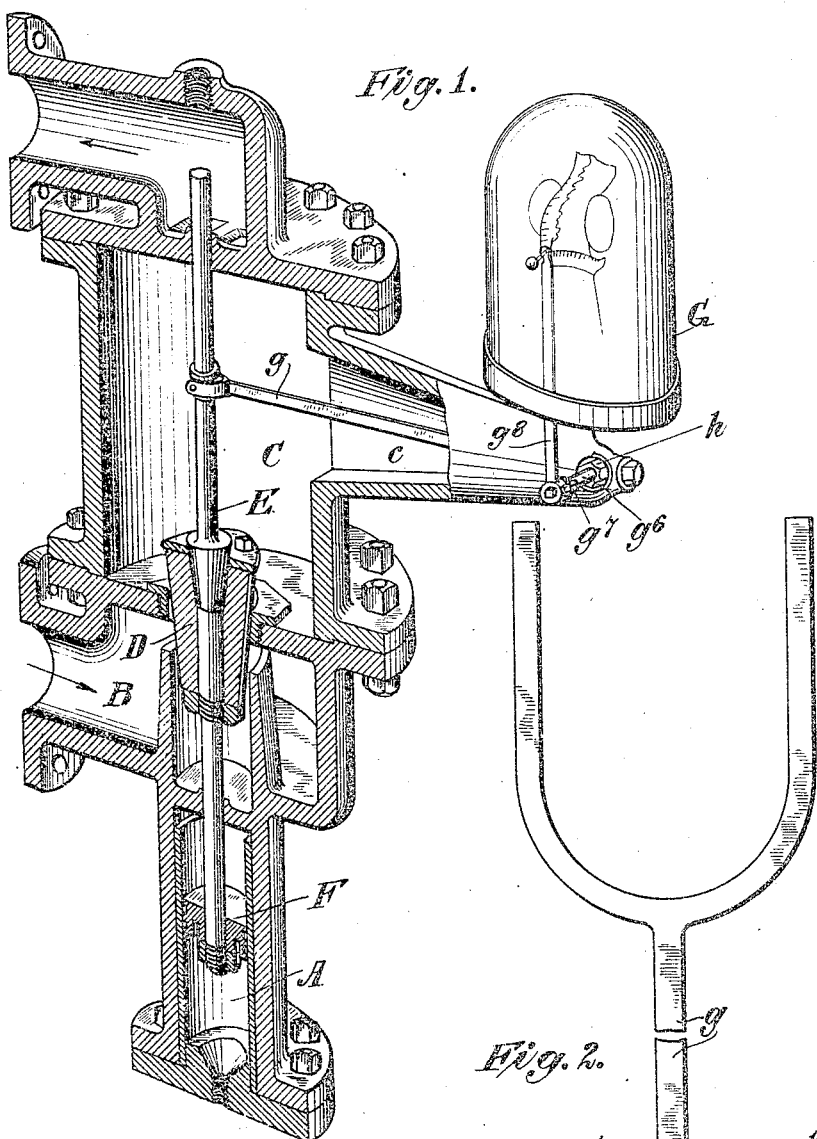
Fig. 1.
Fig. 2.
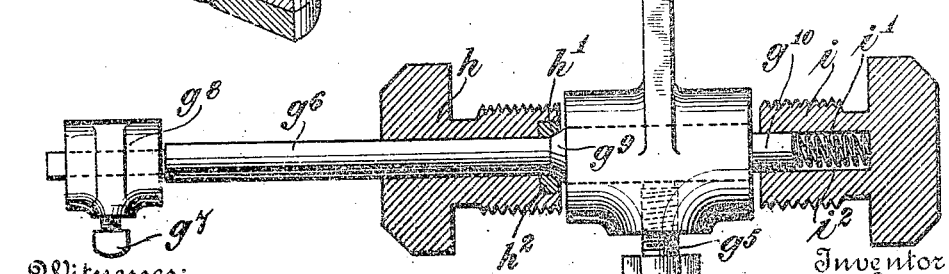
Witnesses:
Inventor
Frederic A. D. Rankins.
By his Attorneys
Redding, Greeley & Austin

UNITED STATES PATENT OFFICE.

FREDERIC A. D. RANKINS, OF BAYONNE, NEW JERSEY, ASSIGNOR TO GAMALIEL C. ST JOHN, OF MONTCLAIR, NEW JERSEY.

STEAM-METER.

1,055,491.  Specification of Letters Patent.  Patented Mar. 11, 1913.

Application filed April 27, 1911. Serial No. 623,749.

*To all whom it may concern:*

Be it known that I, FREDERIC A. D. RANKINS, a citizen of the United States, residing at Bayonne, in the State of New Jersey, have invented certain new and useful Improvements in Steam-Meters, of which the following is a specification, reference being had to the accompanying drawing, forming a part hereof.

This invention relates to steam meters of the general character of that shown in Letters Patent of the United States granted to Gamaliel C. St. John as the assignee of Frank E. Pendleton, No. 963,648, dated July 5, 1910, and to other similar devices. In the steam meter shown in said Letters Patent, the indicating lever located within the extension of the exhaust or exit chamber of the meter, is fixed to a spindle which is extended through a stuffing box in the wall of the chamber and has affixed to it an index finger or stylus. It is found in the use of such meters that in screwing up the stuffing box to stop escape of steam around the spindle the stuffing box is sometimes screwed up so tightly as to interfere with the proper operation of the meter through binding of the spindle.

The present invention has for its object to overcome this difficulty and this object is attained by providing for the spindle to which the indicating lever and the indicating finger are fixed a steam tight joint and bearing of such a character that the friction on the spindle is not varied, and consequently, the accuracy of the meter is not affected.

The invention will be more fully explained hereinafter with reference to the accompanying drawing in which it is illustrated, and in which—

Figure 1 is a perspective view, partly in vertical section, showing a steam meter of the character of that shown in said Letters Patent No. 963,648, with the present improvement applied thereto, and Fig. 2 is a detail view, on a larger scale, showing the indicating lever, spindle and indicating finger, with the threaded plugs in which the spindle has its bearings in section.

The invention is shown in the drawing as applied to a steam meter of the same general construction as that shown in said Letters Patent No. 963,648, the same comprising a dash pot A, an inlet chamber B, an exhaust or exit chamber C, a valve D, a valve rod E, a piston F secured to the valve rod within the dash pot, and indicating and recording mechanism G which is operated from the valve rod E by an indicating lever or arm $g$. All of these parts may be constructed and arranged to operate in the same manner as set forth in said Letters Patent or in any other convenient manner, or may be replaced by metering devices of a different character, the present invention not being concerned with the construction of such devices, except so far as it provides for an operating connection between the indicating lever or arm $g$ and the indicating and recording mechanism G without the use of a stuffing box.

The indicating lever $g$ is fixed to the spindle $g^6$ by a set screw $g^5$, within the extension $c$ of the exhaust chamber and outside of such extension the spindle has fixed thereto, by a set screw $g^7$ the indicating finger or stylus $g^8$, substantially as shown in said Letters Patent.

Between the arm $g$ and the indicating finger $g^8$, the spindle $g^6$ has a bearing in a threaded plug $h$ which is tapped into the wall of the extension chamber $c$. Instead of being provided with a stuffing box, as heretofore, the bearing $h$ is provided with a ground bearing face $h'$ which may be formed on a ring $h^2$ seated in the inner end of the threaded plug and may have any suitable form, being shown in the drawing as conical. The spindle $g^6$ is also provided with a ground bearing face $g^9$ conforming to the ground bearing face $h'$ and formed, it may be, on an integral shoulder of the spindle $g^6$. The coöperating bearing faces $h'$ and $g^9$ are carefully ground to an exact fit so as to form a practically steam tight joint without the employment of any devices which appreciably increase the friction between the spindle and its bearing. The extremity $g^{10}$ of the spindle $g^6$ may be seated in any suitable bearing. As shown in the drawing it has a bearing in a screw threaded plug $i$ which is tapped into the opposite wall of the extension $c$ of the exhaust chamber. The pressure of steam in the chamber might be relied upon to maintain the faces $h'$ and $g^9$ of the ground joint in such contact as to prevent the escape of steam or other fluid within the meter, but it is desirable, in order that such faces may be held in contact under all conditions even when the pressure in the chamber is at or near atmospheric, to provide a light helical spring $i'$ which may be seated in a recess $i^2$ in the plug $i$ and bears against the end of the spindle $g^6$ to hold the bearing face $q^5$ always in contact with the bearing face $h'$.

It will be observed that while the ground joint effectively prevents the escape of steam or other fluid under all conditions, the friction of the spindle in its bearing is very slight and is practically constant under all conditions, so that the accuracy of the meter is retained under all conditions and cannot be destroyed by careless manipulation.

It will be understood that although the invention has been described herein with special reference to its use in connection with a steam meter, it is equally applicable to meters for fluids of any kind, in which an operating connection is to be established through a spindle, which penetrates the casing, between the parts which are internal and those which are external.

I claim as my invention:

1. In a fluid-meter, the combination with a casing, internal operating parts and external operated parts, of a spindle operatively connected internally with the operating parts and operatively connected externally with the operated parts, a bearing plug for the spindle threaded into one wall of the casing, the spindle and the bearing plug having ground contacting bearing faces, a bearing plug for the opposite end of the spindle threaded into the opposite wall of the casing, and a spring seated in said last named bearing plug and bearing against the end of the spindle to hold said bearing faces in contact.

2. In a fluid meter, the combination with a casing, internal operating parts, and external operated parts of a spindle operatively connected internally with the operating parts and operatively connected externally with the operated parts, a bearing plug for the spindle removably threaded into one wall of the casing and forming a part thereof, a bearing ring removably disposed on the inner face of the said bearing plug, the spindle and the ring having ground contacting bearing faces, a bearing plug for the opposite end of the spindle removably threaded into the opposite wall of the casing and forming a part thereof, and a spring seated in said last named bearing plug and bearing against the end of the spindle to hold said bearing faces in contact.

This specification signed and witnessed this 25th day of April, A. D., 1911.

FREDERIC A. D. RANKINS.

Signed in the presence of—
HENRY C. ROEDU, Jr.,
F. E. PENDLETON.